United States Patent
Cho et al.

(10) Patent No.: US 10,454,213 B2
(45) Date of Patent: Oct. 22, 2019

(54) FAILURE DETECTION METHOD IN CHARGING CONNECTOR LOCKING SYSTEM

(71) Applicants: HYUNDAI MOTOR COMPANY, Seoul (KR); KIA MOTORS CORPORATION, Seoul (KR)

(72) Inventors: Ha Young Cho, Suwon-si (KR); Myung Sun Jeong, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 103 days.

(21) Appl. No.: 15/713,375

(22) Filed: Sep. 22, 2017

(65) Prior Publication Data
US 2018/0316136 A1     Nov. 1, 2018

(30) Foreign Application Priority Data
Apr. 28, 2017    (KR) .................. 10-2017-0055198

(51) Int. Cl.
| | | |
|---|---|---|
| *H01R 13/639* | (2006.01) | |
| *B60L 53/16* | (2019.01) | |
| *B60K 35/00* | (2006.01) | |
| *H02J 7/00* | (2006.01) | |
| *H01R 13/66* | (2006.01) | |
(Continued)

(52) U.S. Cl.
CPC .......... *H01R 13/639* (2013.01); *B60K 35/00* (2013.01); *B60L 53/16* (2019.02); *H01R 13/6683* (2013.01); *H02J 7/0026* (2013.01); *H02J 7/0027* (2013.01); *H02J 7/0036* (2013.01); *B60K 2370/52* (2019.05); *B60R 25/01* (2013.01); *E05B 81/76* (2013.01); *H02J 2007/0001* (2013.01)

(58) Field of Classification Search
None
See application file for complete search history.

(56) References Cited

U.S. PATENT DOCUMENTS

| 8,573,994 B2 | 11/2013 | Kiko et al. | |
|---|---|---|---|
| 2014/0292276 A1* | 10/2014 | Osawa | H01R 13/639 |
| | | | 320/109 |
| 2015/0151644 A1 | 6/2015 | Nakajima | |
(Continued)

FOREIGN PATENT DOCUMENTS

| JP | 6014724 B2 | 10/2016 |
|---|---|---|
| KR | 10-2012-0103983 A | 9/2012 |

*Primary Examiner* — John F Mortell
(74) *Attorney, Agent, or Firm* — Morgan, Lewis & Bockius LLP (57) ABSTRACT

A failure detection method in a charging connector locking system includes transmitting, by the main controller, an initial command that is received from the charge controller to the locking device; monitoring, by the main controller, whether the initial command is normally executed by the locking device; and determining, by the main controller, whether a failure occurs in the locking device by monitoring whether the initial command is executed while transmitting, to the locking device, a lock command and an unlock command alternately at predetermined time intervals within a predetermined number of times when the initial command is not normally executed, thereby determining the failure of the locking device with high accuracy.

9 Claims, 4 Drawing Sheets

(51) Int. Cl.
   *E05B 81/76* (2014.01)
   *B60R 25/01* (2013.01)

(56) References Cited

U.S. PATENT DOCUMENTS

2016/0087375 A1\* 3/2016 Yoshizawa ............... B60K 1/04
                                                    439/345
2017/0111347 A1\* 4/2017 Kim ..................... H04L 63/083

\* cited by examiner

FAILURE DETECTION METHOD IN CHARGING CONNECTOR LOCKING SYSTEM

CROSS-REFERENCE TO RELATED APPLICATION

This application is based on and claims the benefit of priority to Korean Patent Application No. 10-2017-0055198, filed on Apr. 28, 2017, in the Korean Intellectual Property Office, the disclosure of which is incorporated herein in its entirety by reference.

TECHNICAL FIELD

The present disclosure relates to a failure detection method in a charging connector locking system and, more particularly, to a technology for accurately detecting a failure in a charging connector locking system which locks a charging connector to prevent the charging connector from being disconnected from a charging inlet, or unlocks the charging connector.

BACKGROUND

In general, an electric vehicle is a vehicle that is driven by an electric motor using a high voltage battery, which is charged by connecting a charging connector of a charging station to a charging inlet of the electric vehicle. Here, when the charging connector is inserted and electrically connected to the charging inlet, power of the charging station may be supplied to the high voltage battery of the electric vehicle to charge the high voltage battery.

Meanwhile, a charging connector locking system may lock the charging connector to prevent the charging connector from being disconnected from the charging inlet, or unlock the charging connector.

For example, when the charging connector is inserted into the charging inlet, a charge controller may transmit a lock command to a main controller. When the main controller receives the lock command from the charge controller, it may control a locking device to prevent the charging connector and the charging inlet from being disconnected. Here, the locking device may set the connected state of the charging connector and the charging inlet to a locked state.

In addition, when charging is completed, the charge controller may transmit an unlock command to the main controller to allow the charging connector to be disconnected from the charging inlet. When the main controller receives the unlock command from the charge controller, it may control the locking device to disconnect the charging connector from the charging inlet. Here, the locking device may set the disconnected state of the charging connector and the charging inlet to an unlocked state.

Such a conventional charging connector locking system determines a failure of the charge controller and the locking device based only on the monitoring results of the corresponding devices, without any additional operation, and thus it may determine the occurrence of a simple error that may be easily solved as a failure.

As a result, the conventional charging connector locking system may not propose a solution with respect to a simple error, and may unconditionally determine the error as a failure.

SUMMARY

The present disclosure has been made to solve the above-mentioned problems occurring in the prior art while advantages achieved by the prior art are maintained intact.

An aspect of the present disclosure provides a failure detection method in a charging connector locking system that can determine a failure or non-failure of a charge controller or a locking device with high accuracy by finally determining the failure or non-failure of the corresponding device after taking an emergency action.

The object of the present disclosure is not limited to the foregoing object, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements and features claimed in the claims and combinations thereof.

According to an aspect of the present disclosure, a failure detection method in a charging connector locking system including a charge controller, a main controller, and a locking device, includes steps of: transmitting, by the main controller, an initial command that is received from the charge controller to the locking device; monitoring, by the main controller, whether the initial command is normally executed by the locking device; and determining, by the main controller, whether a failure occurs in the locking device by monitoring whether the initial command is executed while transmitting, to the locking device, a lock command and an unlock command alternately at predetermined time intervals within a predetermined number of times when the initial command is not normally executed.

The determining step may include: determining that the locking device is in a normal state when the initial command is executed; and determining that the failure has occurred in the locking device when the initial command is not executed.

The failure detection method may further include controlling, by the main controller, a display device to display a determination result.

The failure detection method may further include transmitting, by the main controller, the unlock command to the locking device when it is determined that the failure has occurred in the locking device.

The monitoring step may include monitoring an output voltage of the locking device.

According to another aspect of the present disclosure, a failure detection method in a charging connector locking system including a charge controller, a door controller, a main controller, and a locking device, includes steps of: receiving, by the main controller, a door operation command from the door controller; requesting, by the main controller, information from the charge controller; preliminarily determining, by the main controller, that a failure has occurred in the charge controller when there is no response corresponding to the request; transmitting, by the main controller, a wake-up signal to the charge controller; and finally determining, by the main controller, that a failure has occurred in the charge controller when failing to communicate with the charge controller.

The failure detection method may further include controlling, by the main controller, a display device to display a determination result.

The failure detection method may further include transmitting, by the main controller, an unlock command for disconnecting a charging connector from a charging inlet to the locking device if the door operation command received from the door controller is a door unlock command when it is determined that the failure has occurred in the charge controller.

BRIEF DESCRIPTION OF THE DRAWINGS

The above and other objects, features and advantages of the present disclosure will be more apparent from the following detailed description taken in conjunction with the accompanying drawings:

FIG. 1A and FIG. 1B illustrate an exemplary configuration of a charging connector locking system, to which the present inventive concept is applied; FIG. 1A shows an embodiment having the charging connector locking system installed in a charging station and FIG. 1B shows an embodiment having the charging connector locking system installed in a vehicle;

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of a related known function or configuration will be ruled out in order not to unnecessarily obscure the gist of the present disclosure.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1A:
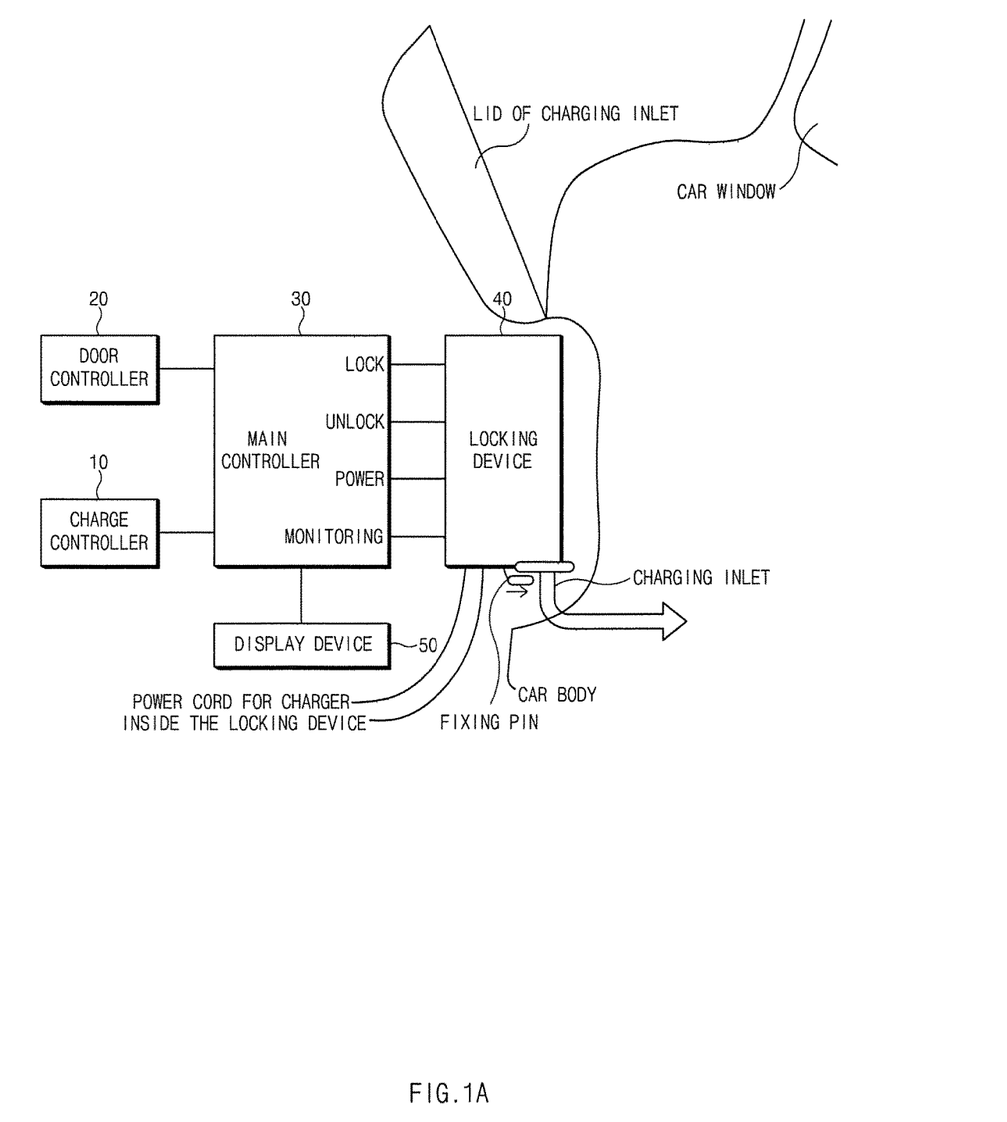
Figure 1B:
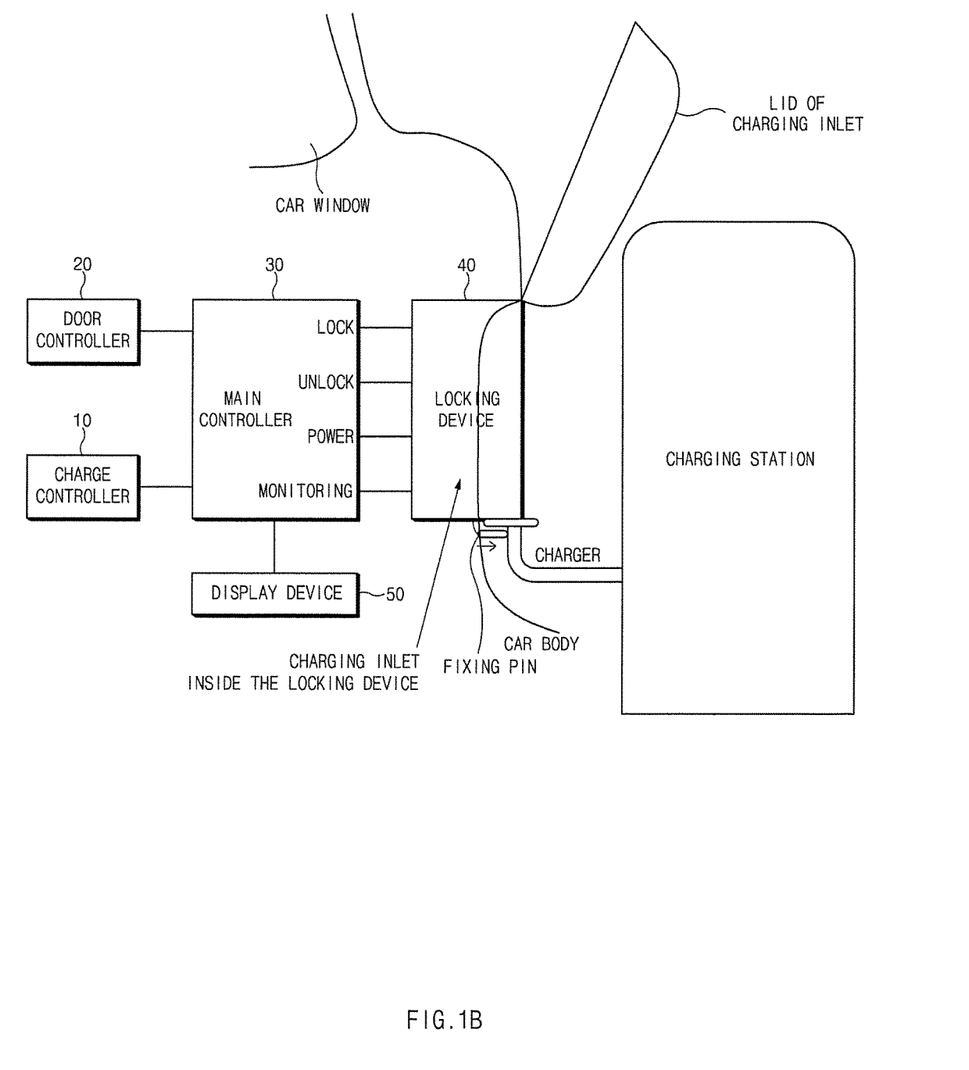

FIG. 1A and FIG. 1B illustrate an exemplary configuration of a charging connector locking system, to which the present inventive concept is applied.

As illustrated in FIG. 1A and FIG. 1B, a charging connector locking system, to which the present inventive concept is applied, includes a charge controller 10, a door controller 20, a main controller 30, a locking device 40, and a display device 50. The charge controller 10, door controller 20, main controller 30, locking device 40, and display device 50 are electric circuitries which perform various function described below by execution of instructions embedded thereon.

The charge controller 10 may generally control a charging system that charges a high voltage battery of an electric vehicle, and may be connected to the main controller 30 through a communication line to transmit a lock command and an unlock command of the locking device 40 to the main controller 30. In other words, the main controller 30 may control the locking device 40 to lock or unlock a charging connector in relation to the connection or disconnection of the charging connector and a charging inlet at the request of the charge controller 10.

In addition, the charge controller 10 may provide a response corresponding to a request from the main controller 30. In other words, when various information is requested by the main controller 30, the charge controller 10 may provide the corresponding information to the main controller 30. For example, when receiving a state check request from the main controller 30, the charge controller 10 may provide current state information to the main controller 30.

In addition, the charge controller 10 may also be activated by a wake-up signal that is received from the main controller 30.

Meanwhile, the charge controller 10 may set a flag for equalizing charge request if a condition for equalizing charge request is satisfied while driving, and automatically activate an equalizing charge mode when standard charging is completed, to thereby maintain a stable energy balance between modules of a battery pack. By controlling a deviation between a module having a maximum state of charge (SOC) and a module having a minimum SOC to be less than or equal to a predetermined value to thereby secure a driving range on one charge, durability of the battery may be improved.

To this end, the charge controller 10 may perform a process including the following operations: determining whether the SOC of the battery reaches 100% and a condition for termination of standard charging is satisfied in the course of standard charging of the battery; continuing the standard charging if the condition for termination of standard charging is not satisfied; determining whether the flag for equalizing charge request has been set if the condition for termination of standard charging is satisfied; terminating the charging of the battery if the flag for equalizing charge request has not been set; activating the equalizing charge mode to supply low current if the flag for equalizing charge request has been set; and terminating the equalizing charge mode when the equalizing charge mode is maintained for a predetermined period of time, and cancelling the flag for equalizing charge request to terminate the charging of the battery.

In addition, if the charge controller 10 is incompatible with a charging protocol of electric vehicle supply equipment (EVSE), it may download and install corresponding charging protocol data from an external server, and receive additional service from the EVSE through power line communication (PLC) uninterruptedly while installing the charging protocol.

To this end, the charge controller 10 may perform a process including the following operations: receiving the additional service from the EVSE through the PLC; transmitting available charging protocol information to the EVSE and receiving a corresponding response; acquiring the corresponding charging protocol data from the external server if there is no charging protocol supported by the EVSE; and installing the acquired protocol data.

The door controller 20 may generally control a door system (for example, a smart key system) that locks or unlocks a door of an electric vehicle. The door controller 20 may be connected to the main controller 30 through a communication line to transmit a door operation command for locking and unlocking the door to the main controller 30. For example, after recognizing a smart key of a driver and receiving a request to unlock the door from the driver (sensing a touch of the driver), the door controller 20 may transmit a door unlock command to the main controller 30. Here, the main controller 30 may check the opening/closing state of the door using on/off switch signals of the door. Advantages of the door controller 20 includes keeping the user and the passengers of the vehicle inside the vehicle with door locked away from high voltage charging process that may hurt a human being if any electric leakage or close contact with the charger occurs.

Meanwhile, when detecting a door lock release from the outside of the door in a state in which a child lock has been set, the door controller 20 may partially open a window of the corresponding door, thereby allowing a user to check the state of the child in the vehicle before opening the door.

To this end, the door controller 20 may perform the functions of setting the child lock for locking the door of the vehicle, releasing the door lock by sensing the user's touch through a touch sensor located outside the door of the vehicle, and opening the window of the corresponding door when the door lock is released in the state in which the child lock has been set.

In addition, the door controller 20 may enable the door lock release using the smart key system, without installation of a separate door antenna in a rear door.

To this end, the door controller 20 may perform a process including the following operations: recognizing an operation of pulling a rear door handle provided on the rear door; detecting a smart key around the vehicle through a door antenna provided in a front door when recognizing the operation of pulling the rear door handle to determine whether the smart key is in the vicinity of the corresponding vehicle; and applying an open signal to the rear door when the smart key of the corresponding vehicle is detected and opening the rear door.

The main controller 30 is a main component that performs a failure detection method in a charging connector locking system according to an exemplary embodiment of the present disclosure, and may interlock with each of the charge controller 10, the door controller 20, and the locking device 40 to determine a failure of the charge controller 10 or the locking device 40.

Hereinafter, the operation of the main controller 30 will be described in detail.

When the main controller 30 receives a lock command or an unlock command from the charge controller 10, it may transmit the lock command or the unlock command to the locking device 40. Here, a lock command transmission line and an unlock command transmission line may be provided between the main controller 30 and the locking device 40, and each transmission line may be provided with a relay.

In other words, when the main controller 30 receives the lock command from the charge controller 10, it may control the locking device 40 to perform a lock function, and when the main controller 30 receives the unlock command from the charge controller 10, it may control the locking device 40 to perform an unlock function.

In addition, the main controller 30 may supply operating power to the locking device 40.

In addition, the main controller 30 may be connected to the locking device 40 through a feedback line to monitor whether the command is normally being executed.

For example, a motor (actuator) in the locking device 40 may output a voltage of 0-2V when operating in a lock mode, and may output a voltage of 4-6V when operating in an unlock mode. Here, when a voltage that is not included in either the voltage range in the lock mode or the voltage range in the unlock mode is output, the main controller 30 may determine that an abnormality has occurred in the motor. This may be a case where the motor fails to sufficiently move a fixing pin until the charging connector is locked or unlocked. This may mainly occur when a foreign object is caught in a moving path of the fixing pin. In this case, the main controller 30 may control the locking device 40 to repeat the forward and reverse movements of the fixing pin several times (for example, five times) so as to remove the foreign object from the moving path of the fixing pin.

Moreover, the main controller 30 may control the locking device 40 in consideration of the moving speed and distance of the fixing pin in accordance with the locked state or the unlocked state, and may also take these factors into consideration when determining the failure of the locking device 40. In other words, the main controller 30 may determine the failure or non-failure of the locking device 40 by taking into consideration the time taken for the charging connector to be locked and the time taken for the charging connector to be unlocked.

In addition, the main controller 30 may request and receive various information from the charge controller 10, and may also provide various information (a state of the locking device) in response to a request from the charge controller 10.

In addition, the main controller 30 may transmit a wake-up signal to the charge controller 10 to activate the charge controller 10.

In addition, the main controller 30 may control the display device 50 to display various information. For example, a failure history, a failure state, and the like may be displayed.

The locking device 40 may include the motor as an actuator. In other words, the locking device 40 may drive the motor to control the movement of the fixing pin for locking or unlocking the charging connector. For example, when the fixing pin is protruded to a predetermined distance, the charging connector may be locked, and when the fixing pin is fully inserted to an initial position, the charging connector may be unlocked. If the fixing pin fails to be protruded to the predetermined distance or fully inserted to the initial position, it may be determined that a foreign object is caught in the moving path of the fixing pin. The foreign object may be removed by driving the motor to move the fixing pin in the forward and reverse directions. When the foreign object is removed and the locking device 40 normally operates, it may not be determined as a failure.

The display device 50 may display various information under the control of the main controller 30.

FIG. 1A shows an embodiment having the charging connector locking system installed in a charging station and FIG. 1B shows an embodiment having the charging connector locking system installed in a vehicle. In FIG. 1A, the fixing pin is controlled by the charging connector locking system installed in the charging station which detects the SOC of the battery of the vehicle and the door condition of the vehicle while in FIG. 1B, the fixing pin is controlled by the charging connector locking system installed in the vehicle which directly detects the SOC of the battery of the vehicle and the door condition of the vehicle.

Figure 2:
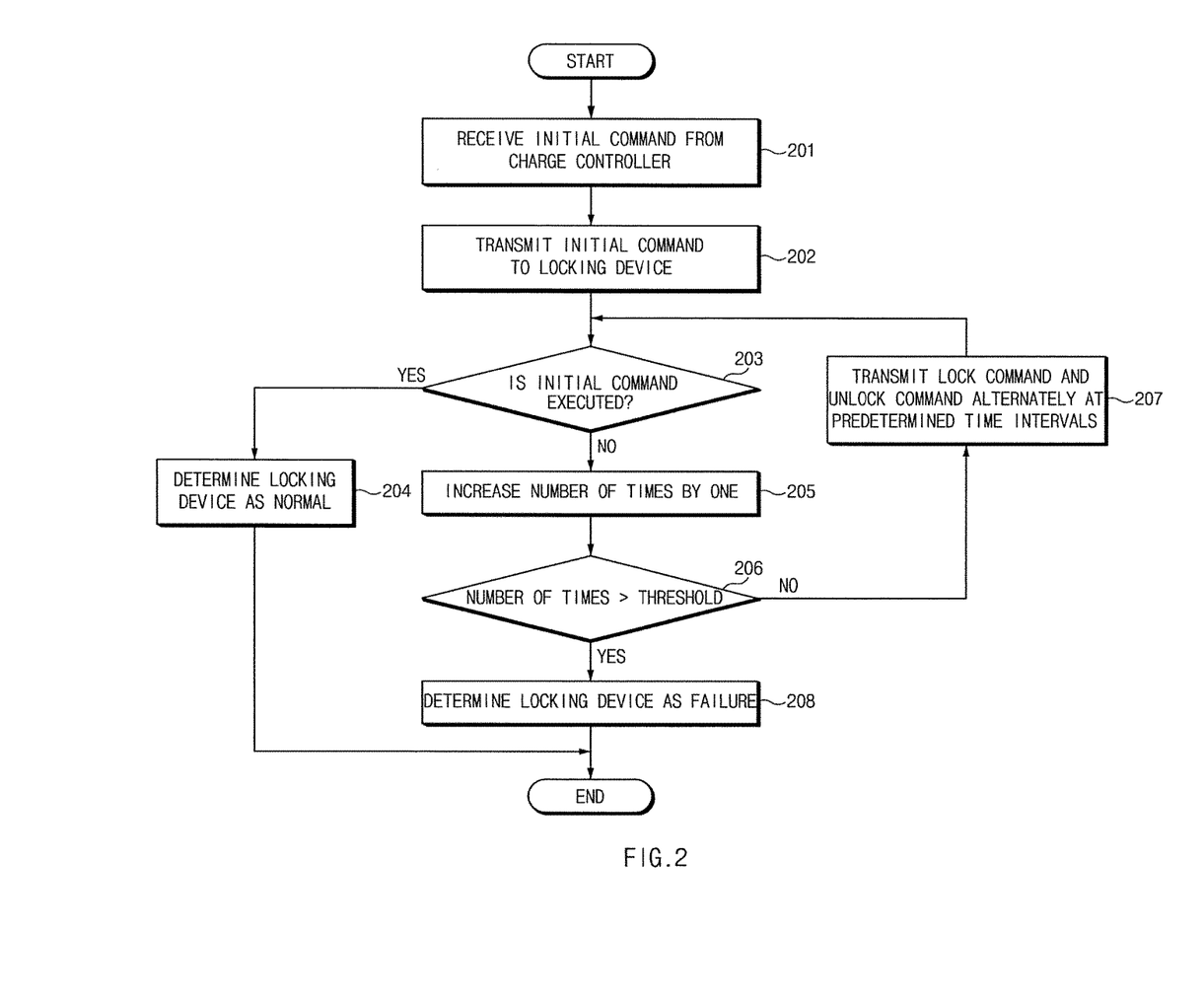
FIG. 2 illustrates a flowchart of a failure detection method in a charging connector locking system, according to an exemplary embodiment of the present disclosure.

FIG. 2 illustrates a flowchart of a failure detection method in a charging connector locking system, according to an exemplary embodiment of the present disclosure. It illustrates a process of determining, by the main controller 30, a failure of the charge controller 10.

First of all, the main controller 30 may receive an initial command (a lock command or an unlock command) from the charge controller 10 in operation 201.

Next, the main controller 30 may transmit the initial command received from the charge controller 10 to the locking device 40 in operation 202. Then, then locking device 40 may execute the received initial command. Here, when the locking device 40 normally operates, the initial command may be executed normally, but when a problem occurs in the locking device 40, the initial command may not be executed normally.

Thereafter, the main controller 30 may monitor an output voltage of the locking device 40 to check whether or not the initial command is executed normally in operation 203.

As a result of operation 203, when the initial command is executed normally, it may be determined that the locking device 40 is in a normal state in operation 204.

As a result of operation 203, when the initial command is not executed normally, an emergency action may be taken before determination of a failure. In other words, the main controller 30 may determine whether or not the initial command is executed while transmitting a lock command and an unlock command alternately at predetermined time intervals to the locking device 40, in operations 205 to 207. Here, the emergency action may be taken within a predetermined number of times (for example, five times), and one emergency action refers to a case where the lock command and the unlock command are transmitted once.

When the initial command is executed in the course of the emergency action, it may be determined that the locking device 40 is in the normal state. However, when the initial command is not executed, it may be finally determined that a failure has occurred in the locking device 40 in operation 208.

Then, the main controller 30 may also control the display device 50 to display the determination result.

Meanwhile, when it is determined that the failure has occurred in the locking device 40, the main controller 30 may finally transmit the unlock command to the locking device 40 and end the process. This operation may be prepared for a case in which only the locking function of the locking device 40 is failed and the unlocking function thereof is normal. If the charging connector is not unlocked, it may be difficult to disconnect the charging connector, causing discomfort to the driver.

Figure 3:
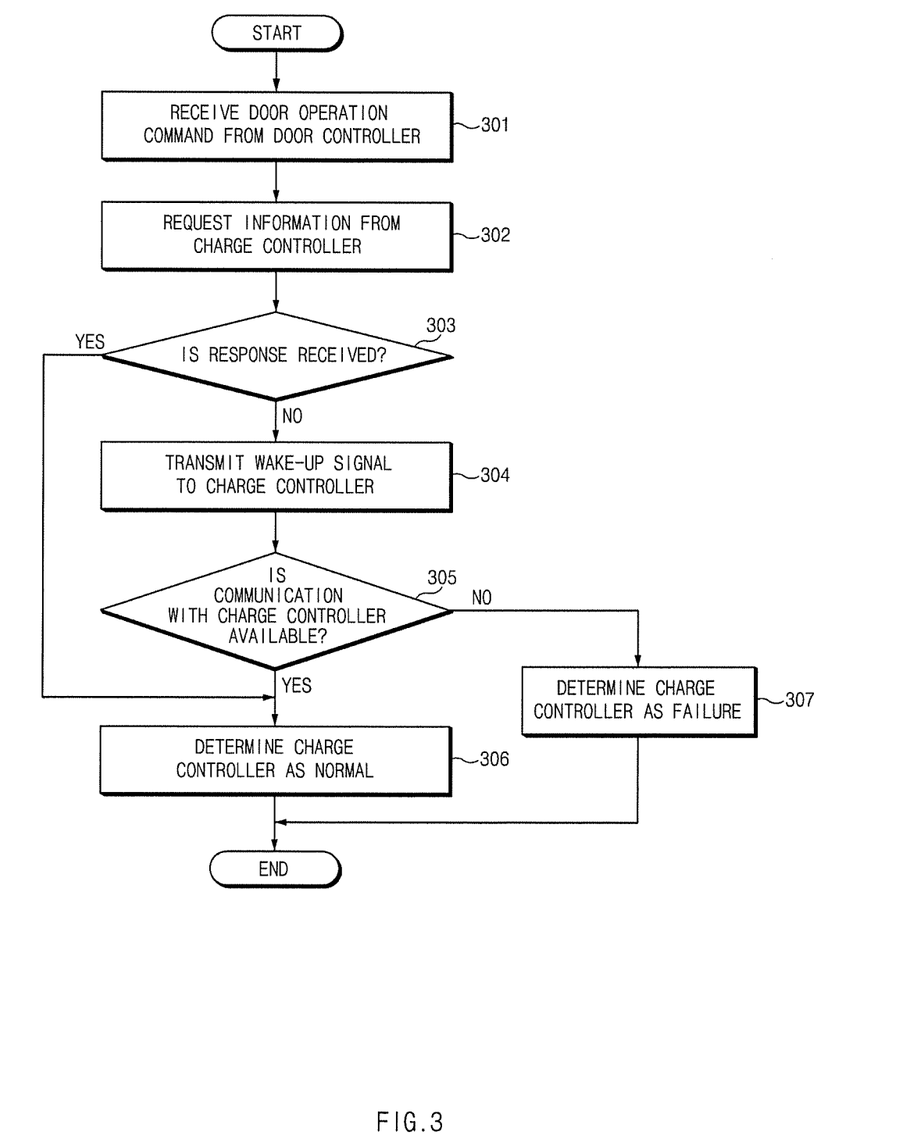
FIG. 3 illustrates a flowchart of a failure detection method in a charging connector locking system, according to another exemplary embodiment of the present disclosure.

FIG. 3 illustrates a flowchart of a failure detection method in a charging connector locking system, according to another exemplary embodiment of the present disclosure. It illustrates a process of determining, by the main controller 30, a failure of the charge controller 10.

First of all, the main controller 30 may receive a door operation command from the door controller 20 in operation 301. Here, the door operation command refers to a door lock command or a door unlock command.

Next, the main controller 30 may request information from the charge controller 10 in operation 302. Here, the information may be a state check request.

Thereafter, the main controller 30 may check whether or not a response has been received from the charge controller 10 in operation 303.

As a result of operation 303, when the response is received from the charge controller 10, it may be determined that the charge controller 10 is in a normal state in operation 306.

As a result of operation 303, when the response is not received from the charge controller 10, the main controller 30 may transmit a wake-up signal to the charge controller 10 in operation 304.

Then, it may be determined whether or not the main controller 30 is in communication with the charge controller 10 in operation 305.

As a result of operation 305, when the main controller 30 communicates with the charge controller 10, it may be determined that the charge controller 10 is in a normal state in operation 306.

As a result of operation 305, when the main controller 30 fails to communicate with the charge controller 10, it may be determined that a failure has occurred in the charge controller 10 in operation 307.

Then, the main controller 30 may also control the display device 50 to display the determination result.

Meanwhile, after it is determined that the failure has occurred in the charge controller 10, if the door operation command received from the door controller 20 is a door unlock command, the main controller 30 may transmit the unlock command to the locking device 40 considering the possibility of disconnection of the charging connector. In other words, when the received door operation command is the door unlock command in a state in which the failure has occurred in the charge controller 10, the main controller 30 may transmit the unlock command to the locking device 40, thereby allowing the driver to disconnect the charging connector from the charging inlet.

As set forth above, the failure detection method in a charging connector locking system, according to exemplary embodiments of the present disclosure, can determine the failure or non-failure of the charge controller or the locking device with high accuracy by finally determining the failure or non-failure of the corresponding device after taking an emergency action.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A failure detection method in a charging connector locking system including a charge controller, a main controller, and a locking device, the failure detection method comprising steps of:
    transmitting, by the main controller, an initial command that is received from the charge controller to the locking device;
    monitoring, by the main controller, whether the initial command is normally executed by the locking device; and
    determining, by the main controller, whether a failure occurs in the locking device by monitoring whether the initial command is executed while transmitting, to the locking device, a lock command and an unlock command alternately at predetermined time intervals within a predetermined number of times when the initial command is not executed.

2. The failure detection method according to claim 1, wherein the determining step comprises:
    determining that the locking device is in a normal state when the initial command is executed; and
    determining that the failure has occurred in the locking device when the initial command is not executed.

3. The failure detection method according to claim 1, further comprising controlling, by the main controller, a display device to display a determination result.

4. The failure detection method according to claim 1, further comprising transmitting, by the main controller, the unlock command to the locking device when it is determined that the failure has occurred in the locking device.

5. The failure detection method according to claim 1, wherein the monitoring step comprises monitoring an output voltage of the locking device.

6. A failure detection method in a charging connector locking system including a charge controller, a door controller, a main controller, and a locking device, the failure detection method comprising steps of:
- receiving, by the main controller, a door operation command from the door controller;
- requesting, by the main controller, information from the charge controller;
- preliminarily determining, by the main controller, that a failure has occurred in the charge controller when there is no response corresponding to the request;
- transmitting, by the main controller, a wake-up signal to the charge controller; and
- finally determining, by the main controller, that a failure has occurred in the charge controller when failing to communicate with the charge controller.

7. The failure detection method according to claim 6, further comprising controlling, by the main controller, a display device to display a determination result.

8. The failure detection method according to claim 6, further comprising transmitting, by the main controller, an unlock command for disconnecting a charging connector from a charging inlet to the locking device if the door operation command received from the door controller is a door unlock command when it is determined that the failure has occurred in the charge controller.

9. A failure detection method in a charging connector locking system installed in a vehicle including a charge controller, a main controller, and a locking device, the failure detection method comprising steps of:
- transmitting, by the main controller, an initial command that is received from the charge controller to the locking device;
- monitoring, by the main controller, whether the initial command is normally executed by the locking device; and
- determining, by the main controller, whether a failure occurs in the locking device by monitoring whether the initial command is executed while transmitting, to the locking device, a lock command and an unlock command alternately at predetermined time intervals within a predetermined number of times when the initial command is not executed.

* * * * *